(12) United States Patent
Calico et al.

(10) Patent No.: US 8,804,810 B1
(45) Date of Patent: Aug. 12, 2014

(54) WIDEBAND SIGNAL SYNTHESIS

(75) Inventors: Steve E. Calico, Fort Worth, TX (US); David S. Hidinger, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1728 days.

(21) Appl. No.: 11/869,036

(22) Filed: Oct. 9, 2007

Related U.S. Application Data

(60) Provisional application No. 60/957,660, filed on Aug. 23, 2007.

(51) Int. Cl.
  *H03K 7/06* (2006.01)
  *H03K 9/08* (2006.01)
  *H03K 7/08* (2006.01)
  *H04L 27/00* (2006.01)

(52) U.S. Cl.
  USPC ............ 375/239; 375/259; 375/295; 375/316

(58) Field of Classification Search
  USPC ......... 375/211, 214, 219, 220, 222, 259, 260, 375/271, 273, 275, 276, 277, 278, 279, 280, 375/295, 296, 299, 316, 340, 346, 347; 342/134, 21, 128, 130, 132, 175, 194, 342/195, 196, 200, 201, 202
  See application file for complete search history.

(56) References Cited

U.S. PATENT DOCUMENTS

| | | | | |
|---|---|---|---|---|
| 3,701,154 A | * | 10/1972 | McKinney | 342/16 |
| 5,960,028 A | * | 9/1999 | Okamoto et al. | 375/130 |
| 2002/0146080 A1 | * | 10/2002 | Dress et al. | 375/316 |
| 2003/0162514 A1 | * | 8/2003 | Chu et al. | 455/127 |
| 2005/0111577 A1 | * | 5/2005 | Fuchs | 375/298 |
| 2006/0227851 A1 | * | 10/2006 | Shattil | 375/133 |
| 2007/0110198 A1 | * | 5/2007 | Skarby et al. | 375/349 |
| 2010/0142781 A1 | * | 6/2010 | Walker et al. | 382/131 |

* cited by examiner

*Primary Examiner* — Sam K Ahn
*Assistant Examiner* — Linda Wong
(74) *Attorney, Agent, or Firm* — Withrow & Terranova, PLLC

(57) ABSTRACT

A method for synthesizing a wideband signal includes: generating a plurality of narrowband radio frequency signals; and constructively superimposing the narrowband radio frequency signals. In one aspect, this includes determining the delays for a plurality of constituent narrowband signals for use in synthesizing a wideband signal. The delay determination is software implemented, and thus may be embodied in software encoded on a program storage medium and a computing apparatus programmed to perform that method. An apparatus for synthesizing a wideband signal includes: a pulsed power source; a plurality of narrow band radio frequency source modules capable of receiving a signal form the pulse power source and outputting constituent narrowband radio frequency signal; a combiner for combining the constituent narrowband radio frequency signals after they have been uniquely delayed into a synthetic wideband radio frequency signal.

12 Claims, 7 Drawing Sheets

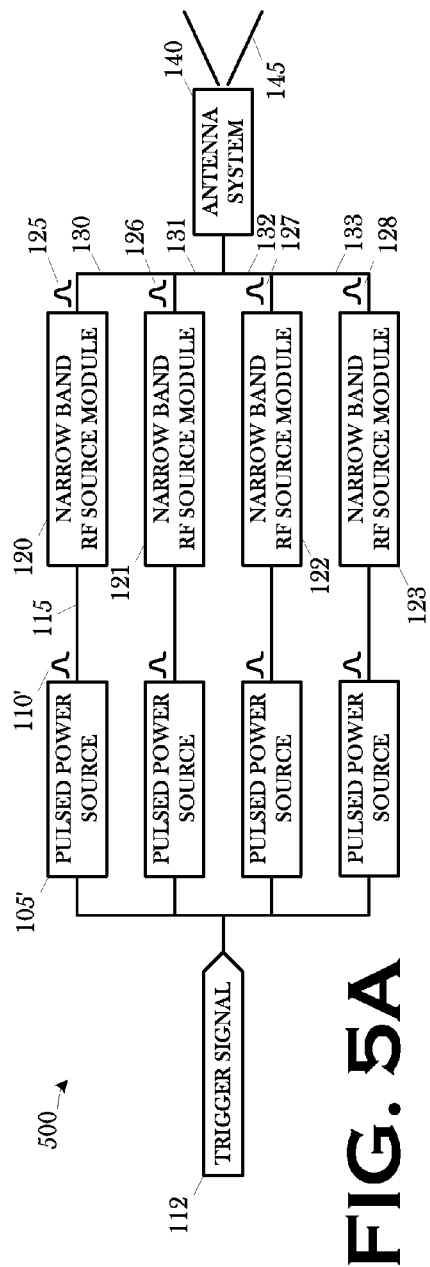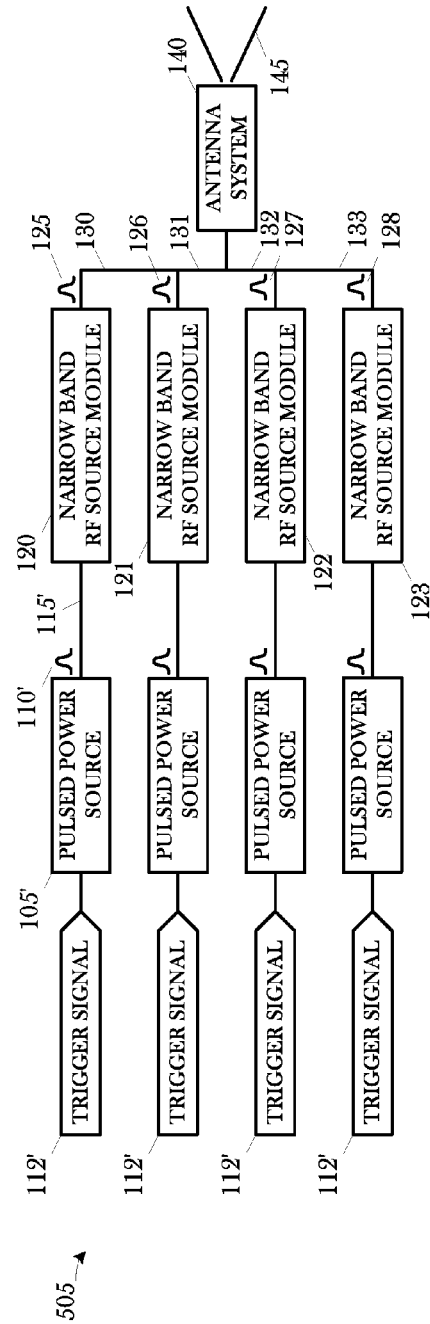

WIDEBAND SIGNAL SYNTHESIS

We claim the earlier effective filing date of U.S. Provisional Application Ser. No. 60/957,660, entitled "Wideband Signal Synthesis", and filed Aug. 23, 2007, in the name of the inventors Steve E. Calico and David S. Hidinger. This provisional application is hereby incorporated by reference for all purposes as if set forth verbatim herein.

BACKGROUND OF THE INVENTION

1. Field of the Invention

The present invention pertains to generation of radio frequency electromagnetic signals, and, more particularly, synthesis of wideband radio frequency signals.

2. Description of the Related Art

One useful way to categorize radio frequency ("RF") signals for some types of uses is by their bandwidth content. Two commonly used terms in this regard include "narrowband" and "wideband". An ideal narrowband signal would comprise an infinitely long pulse containing a single frequency. An ideal wideband signal, on the other hand, is a "zero duration" pulse containing every frequency.

Thus, in general, wideband signals are traditionally generated using very short pulse widths—i.e., very short temporal pulses. These short pulses are typically less than 1 cycle of a narrowband signal. The short pulses generate frequency components across a broad band that is centered on the frequency of the narrowband signal. These short pulses therefore contain very broad frequency content.

There are a number of techniques currently employed for generating wideband signals. Perhaps the most common is the "spark gap discharge". This mechanism is very similar to that by which a spark plug produces a spark in an internal combustion engine. The short duration discharge of energy generates a wideband signal.

However, the very nature of a time-limited pulse limits the amount of energy that can be contained in the pulse. This limit becomes quite stringent in a wideband signal because the pulse is so short. A known limitation of "traditional" wideband signals is the very high power and peak field required to propagate energy in the pulse. This often becomes the physical limitation in generating a wideband signal.

The present invention is directed to resolving, or at least reducing, one or all of the problems mentioned above.

SUMMARY OF THE INVENTION

In a first aspect, the invention includes a method for synthesizing a wideband signal, comprising: generating a plurality of narrowband radio frequency signals; and constructively superimposing the narrowband radio frequency signals. In a second aspect, the invention includes a method, comprising determining the delays for a plurality of constituent narrowband signals for use in synthesizing a wideband signal. In third and fourth aspects, the invention includes a program storage medium and a computing apparatus for use in performing the method of the second aspect. In a fifth aspect, the invention includes an apparatus comprising: a pulsed power source; a plurality of narrow band radio frequency source modules capable of receiving a signal from the pulse power source and outputting constituent narrowband radio frequency signal; a combiner for combining the constituent narrowband radio frequency signals after they have been uniquely delayed into a synthetic wideband radio frequency signal.

BRIEF DESCRIPTION OF THE DRAWINGS

The invention may be understood by reference to the following description taken in conjunction with the accompanying drawings, in which like reference numerals identify like elements, and in which:

FIG. 5A-FIG. 5B depict two variations on the apparatus of FIG. 1;

Figure 1:
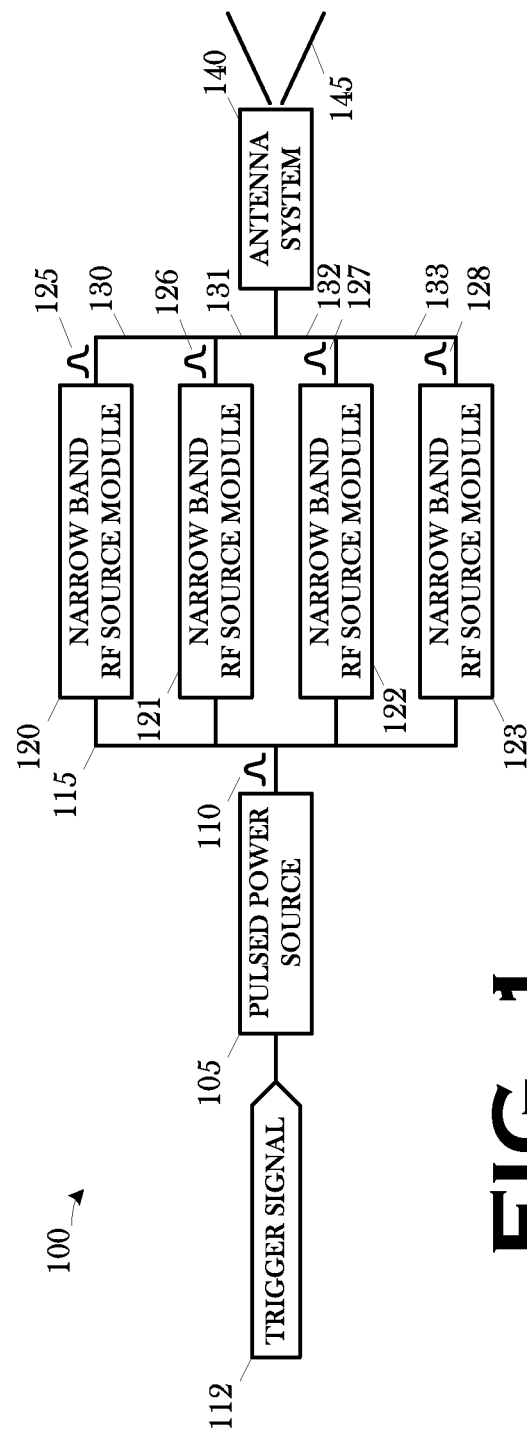
FIG. 1 illustrates one particular embodiment of an apparatus in accordance with one aspect of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The short pulse width associated with conventional wideband waveforms can be generated using less sophisticated technologies associated with narrowband systems. Using multiple sources combined to generate the wideband output mitigates the high voltage requirement of a single source and provides enhanced spectral efficiency. A control system allows the tailoring of the wideband signal to include bandwidth, center frequency, and amplitude. Thus, the wideband signal synthesis techniques disclosed herein combines waveforms available from conventional high-power, narrowband technology resulting in a high-power wideband signal. The frequency, amplitude, and relative phase of the narrowband signals determine the parameters of the wideband output.

The present invention generates wideband, high energy content signals. The invention consists of a numerical method to constructively superimpose a plurality of narrowband signals to generate a specific output. By using several pulses, which are superimposed constructively, more energy can be contained in the wideband signal. In addition, it will be easier to physically generate the wideband signal. A known limitation of "traditional" wideband signals is the very high power and peak field required to propagate energy in the pulse. This often becomes the physical limitation in generating a wideband signal. The present invention thereby propagates significant energy without extremely high fields to overcome the traditional limitations of high power and peak fields encountered by conventional wideband signal generation techniques.

The constructive superposition disclosed herein controls the interference patterns by calculating precise time delays between the narrowband signals to produce a specific output. A simple superposition will produce time- and space-varying interference patterns in the resultant signal such that it will not be suitable as a wideband source.

"Narrowband" signals, in this context, are signals with a bandwidth of less than or equal to 20% of their center frequency. Bandwidth is determined by the width of the frequency spectrum at the points where the signal's magnitude is half of the maximum peak. "Wideband" signals are defined as signals with a bandwidth of greater than 20% of their center frequency. Bandwidth is determined by the width of the frequency spectrum at the points where the signal's magnitude is half of the maximum peak. Note that these terms are used in a distinctly different manner than in the telecommunications industry. The telecommunications industry defines bandwidths, and characterizes narrow- or wide-band, as a function of the data rate being transmitted.

FIG. 1 illustrates one particular embodiment of an apparatus 100 in accordance with one aspect of the present invention for generating wideband signal synthesis pulses. As will be discussed further below, wideband signal synthesis is, in general, the process of inputting the RF source module characteristics, and calculating the required phase delays to produce a desired output.

A pulsed power source 105 produces a voltage pulse 110 of known characteristics (amplitude, rise time, fall time, and pulse width). Any suitable pulsed power source known to the art may be employed to implement the power source.

The pulse 110 is produced responsive to the trigger signal 112, generated by a conventional controller (not shown). The pulse is sent down cables 115 (only one indicated) of equal length. The equal length of the cables 115 ensure simultaneous arrival of the voltage pulse at each of several narrow band, radio frequency ("RF") source modules 120-123 and that the arriving pulses all have the same, known characteristics, to include rise time, fall time, pulse width, and pulse shape. FIG. 1 depicts four RF source modules, but any number may be used. Thus, the present invention is not limited by the number of RF source modules.

The invention admits wide variation in the implementation of the RF source modules 120-123. The present invention may employ any narrow band, RF source known to the art suitable for the given application of the apparatus 100. Thus, the RF source modules 120-123 could be magnetron devices, non-linear transmission line devices, gyromagnetic precession oscillators, or any of a number of devices for creating RF energy known to the art.

More particularly, a Gyromagnetic Precession Oscillators ("GPO") is a solid state device, which uses the gyromagnetic properties of ferrites to convert an input video pulse into RF energy. By controlling the input pulse and magnetic field bias parameters, the RF energy can be tailored over a range of center frequencies and instantaneous bandwidths. The center frequency of a GPO is tunable by ~10%, based on the input video pulse and applied bias.

Nonlinear Transmission Lines ("NLTLs") are ferrite-based devices which create microwaves by forming an oscillating L-C network and using ferrites as the nonlinear inductor switching elements. However, NLTLs have a fundamental upper limit of ~1.8 GHz that may limit their usefulness for some applications.

Conventional High Power Microwave ("HPM") magnetron devices can be employed to produce the desired RF frequency, but are somewhat limited in instantaneous bandwidth and tunability. Thus, a relatively larger number of source modules would be used to achieve a given bandwidth of the output wideband signal (as compared to GPOs or NLTLs) for most applications. A magnetron-based apparatus would not be retunable, but would rather be hard-wired to produce a single (or possibly a very small number of) wideband outputs.

The RF source modules 120-123 convert the input voltage pulse into a Radio Frequency (RF) output pulse by some means. Each RF source module 120-123 produces an output pulse 125-128 having a specific output frequency 125-128 and pulse duration. The output pulses 125-128 are carried over conductors 130-133 which could be cables, or waveguides, or any other means of conducting the pulses. The conductors 130-133 are designed to impart a specific phase delay in the respective signal 125-128 it carries. The phase delay can be accomplished by controlling the length of the conductors 130-133, or inserting a phase shifting element such as a dielectric or a ferromagnetic element in line with the conductors 130-133.

The signals 125-128 arrive at an antenna system 140, each with a unique frequency spectrum, and at a specific time relative to one another, as controlled by the conductors 130-133. The signals 125-128 are combined, and are radiated from a common {meaning the same, not mundane} antenna system 140. The combined signal is a synthetic, wideband signal 145 that is then radiated into the environment.

The use of multiple narrowband source modules 120-123 to construct the synthetic, wideband signal 145 in this manner allows for more energy in the synthetic, wideband signal 145, and allows the synthetic, wideband signal 145 to be dynamically refined. Not only does this technique allow for higher energy pulses, the pulses are more "spectrally efficient" and they provide better coverage across the bandwidth than any conventional pulse. By generating the pulses using narrow band source modules, the technique could also produce either narrow band or wideband pulses by adjusting the time delays.

The invention admits variation in the construction and operation of the antenna system 140. The antenna system 140 may be, for example, a spatial combiner array. A spatial combiner array tailors separate array elements to each of the source modules, and combines the signals without interference in the far field. Alternatively, the antenna system 140 may be a power combiner and constant-phase-center antenna. This approach to radiating the synthetic wideband signal combines the signals in a traditional cable or waveguide combiner, then radiates the combined signal from a single antenna. In this approach, the combiner will be selected for power handling and isolation requirements. The antenna structure should also treat the diverse component signals in such a way as to avoid interference patterns in the far field.

Thus, the combiner for the constituent signals may comprise a high power signal combiner with a constant-phase-center antenna. High power signal combiners are known in the art. A constant-phase-center antenna is an antenna that is loaded or tailored to keep the phase center constant as the antenna aperture "fills". Both high power signal combiners and constant-phase-center antennas are commercially available and any suitable implementation may be used. Alternatively, it may comprise an array of antennas, which combine the signal in the far field. Still other combination techniques may be employed in alternative embodiments.

Figure 2A:
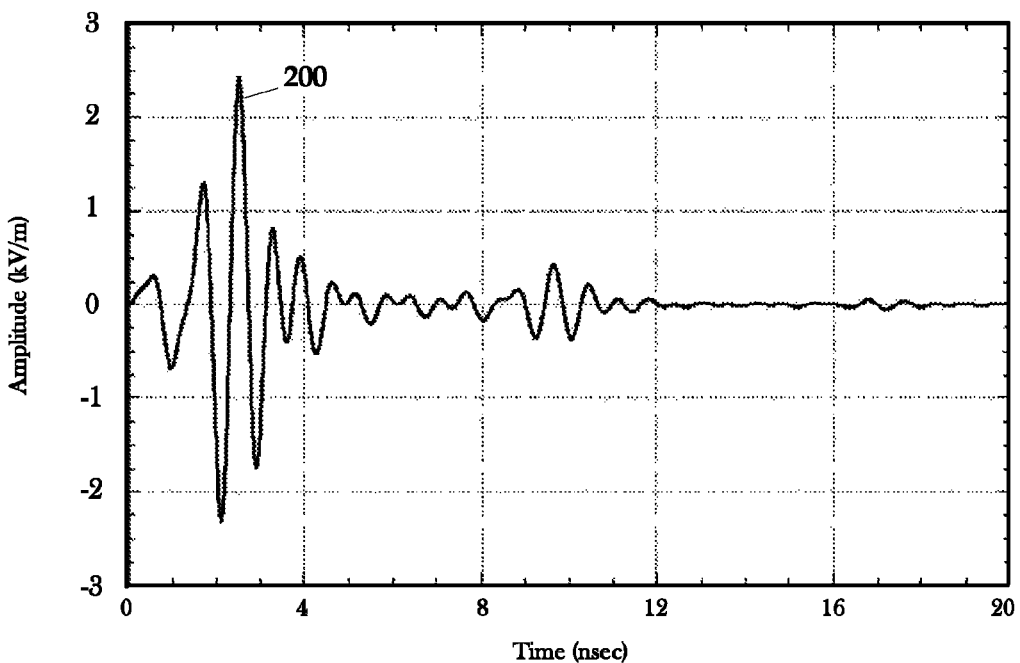
FIG. 2A graphs a synthetic wideband signal in the time domain, the synthetic wideband signal being generated in accordance with one particular embodiment of the present invention.
Figure 2B:
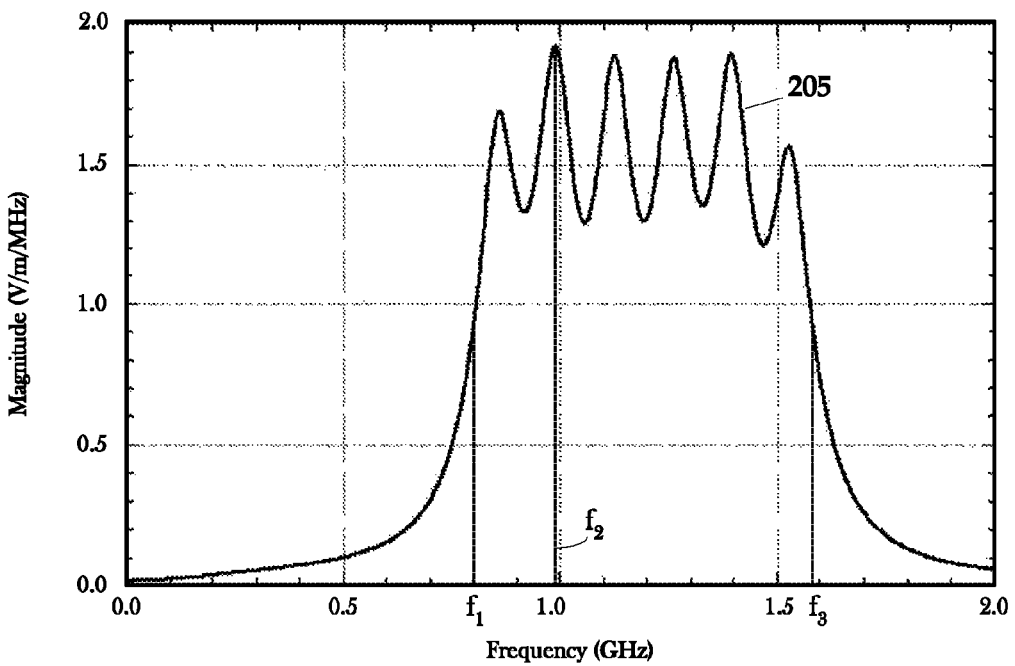
FIG. 2B graphs the waveform spectrum of the synthetic wideband signal of FIG. 2A.
Figure 3A:
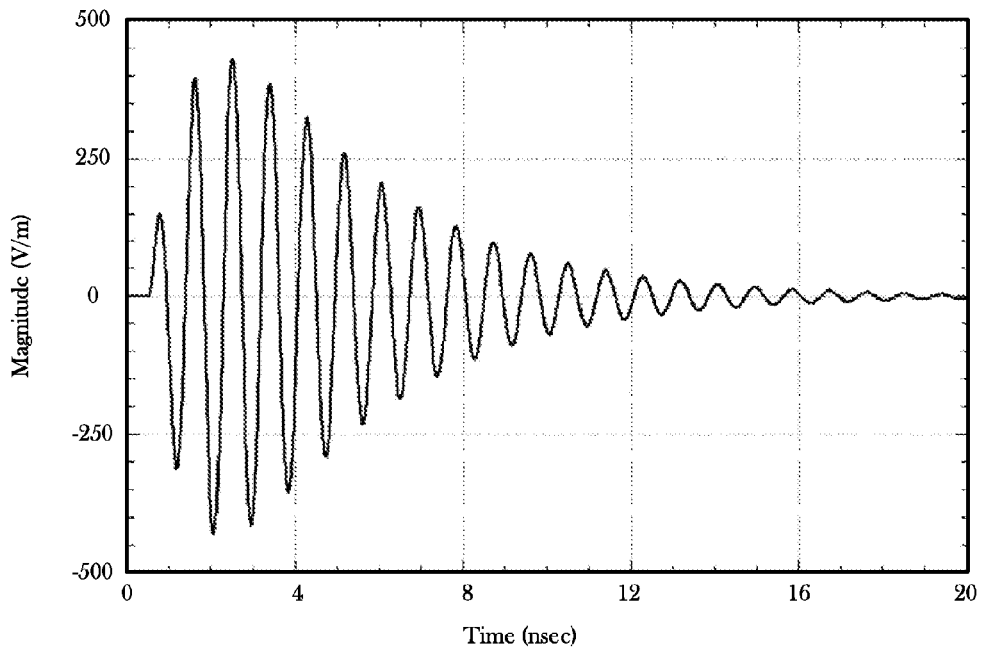
FIG. 3A graphs the 1125 MHz component of the synthetic signal of FIG. 2A-FIG. 2B in the time domain.
Figure 3B:
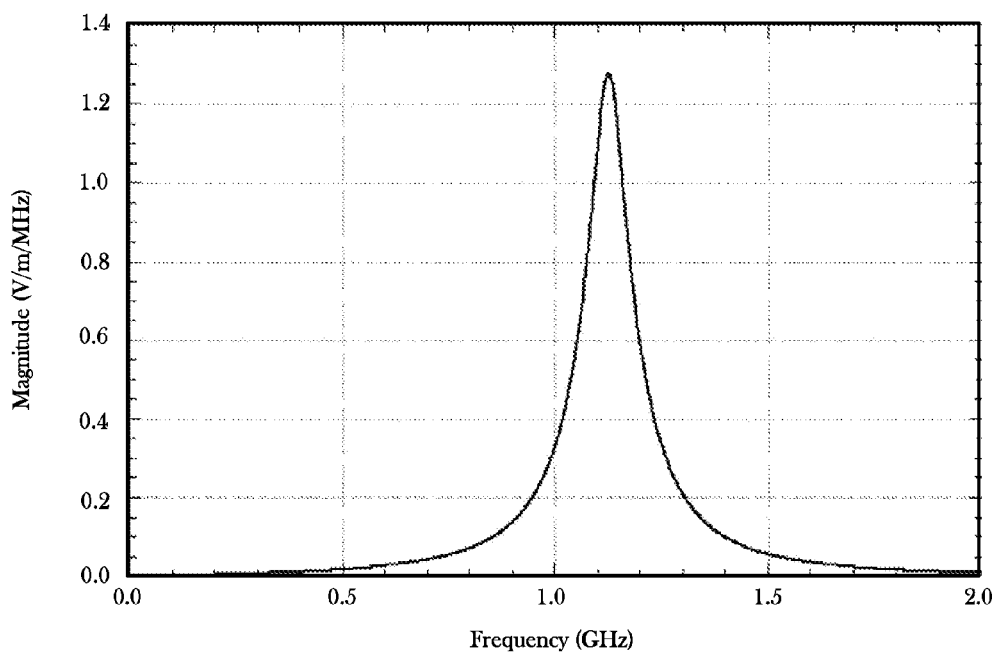
FIG. 3B graphs the spectrum of the 1125 MHz component in FIG. 3A.

FIG. 2A illustrates a synthetic wideband signal 200 in the time domain, the synthetic wideband signal being generated in accordance with one particular embodiment of the present invention. FIG. 2B illustrates the magnitude of the waveform spectrum 205 of the synthetic wideband signal 200 of FIG. 2A. Table 1 lists frequencies and magnitudes for points $f_1$-$f_3$ in FIG. 2B. The synthetic wideband signal 200 comprises six components, narrow band signals at frequencies of 855 MHz, 990 MHz, 1125 MHz, 1260 MHz, 1395, and 1530 MHz. FIG. 3A graphs the 1125 MHz component of the synthetic signal of FIG. 2A-FIG. 2B in the time domain and FIG. 3B graphs the spectrum of the 1125 MHz component in FIG. 3A. As will be appreciated by those in the art having the benefit of this disclosure will appreciate, the other components will have a similar appearance.

TABLE 1

Frequencies and Magnitudes in FIG. 2B

| Point | Frequency (GHz) | Magnitude (V/m/MHz) |
|---|---|---|
| $f_1$ | 8.02e+08 | $|F| = 0.966057$ |
| $f_2$ | 9.86e+08 | $|F| = 1.92148$ |
| $f_3$ | 1.579e+09 | $|F| = 0.962097$ |

Figure 4A:
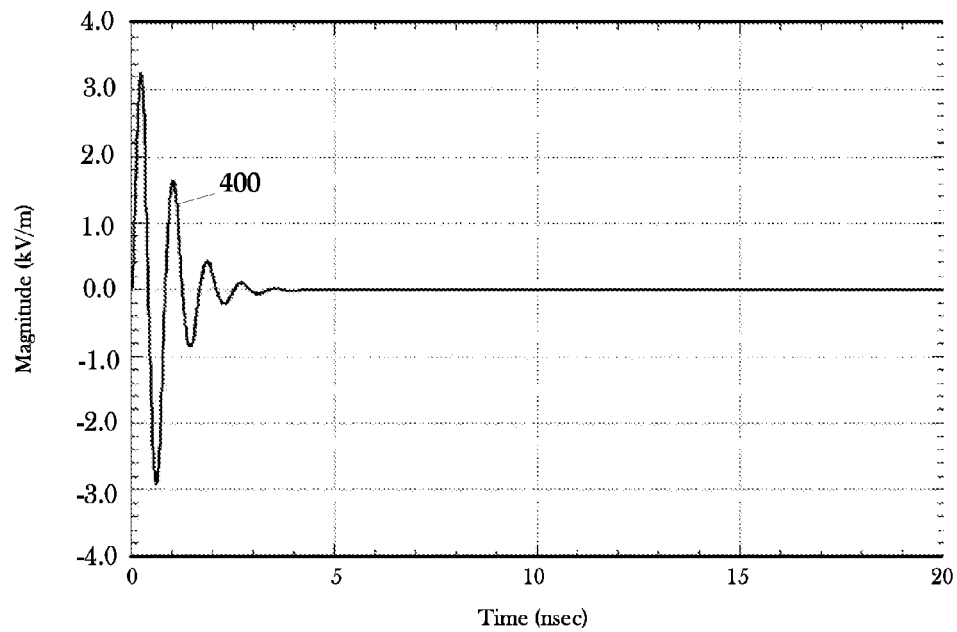
FIG. 4A graphs a second conventional wideband signal in the time domain, the conventional wideband signal being generated in accordance with one particular embodiment of the present invention.

For comparison, and to demonstrate the efficacy of the present invention, similar graphs are shown for a wideband signal generated using conventional, spark gap techniques. FIG. 4A graphs the signal 400 in the time domain and FIG. 4B graphs the waveform spectrum 405 of the signal 400 of FIG. 4A. Table 2 lists frequencies and magnitudes for points $f_1$-$f_3$ in FIG. 4B.

TABLE 2

Figure 4B:
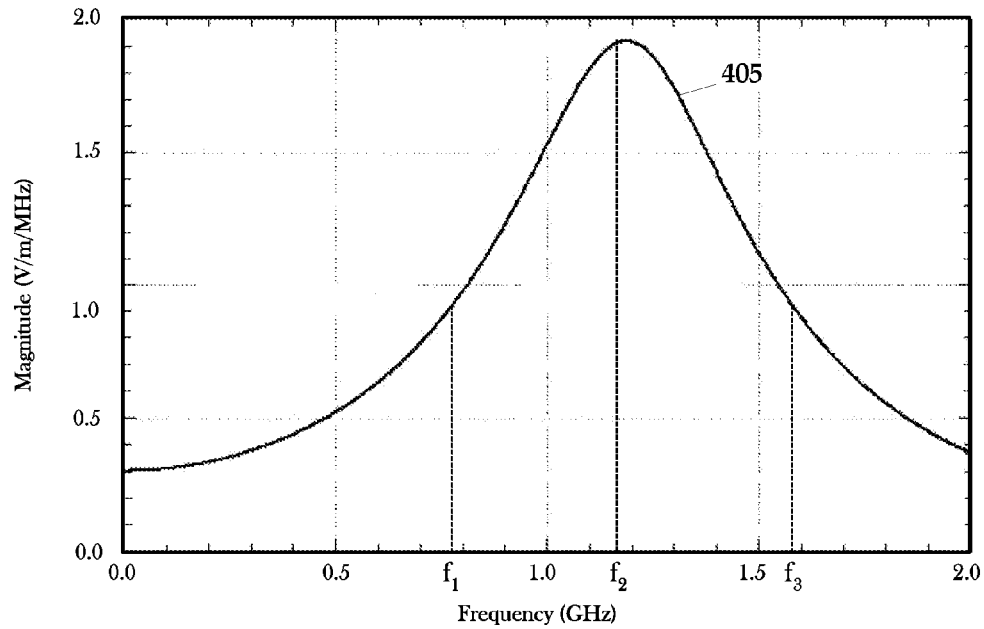
FIG. 4B graphs the waveform spectrum of the conventional wideband signal of FIG. 4A.

Frequencies and Magnitudes in FIG. 4B

| Point | Frequency (GHz) | Magnitude (V/m/MHz) |
|---|---|---|
| $f_1$ | 7.92e+08 | $|F| = 0.962191$ |
| $f_2$ | 1.185e+09 | $|F| = 1.92266$ |
| $f_3$ | 1.563e+09 | $|F| = 0.961541$ |

Still other variations and alternative embodiments other than those disclosed above may be realized. In general, areas ripe for variation include:

triggering the pulsed power;
delaying the signal from pulsed power to source;
delaying the signal from source to antenna; and
the antenna system (at the combiner, if one is used).
Still other variations may be realized by those skilled in the art having the benefit of this disclosure.

For example, the apparatus 100 in FIG. 1 uses a common pulser (i.e., the pulsed power source 105) and delays some of the outputs as described. One variation would be to employ multiple pulsers. Thus, the apparatus 500 in FIG. 5A replaces the single pulsed power source 105 of FIG. 1 with four pulsed power sources 105' (only one indicated) triggered by a common trigger signal 112. Accordingly, the delay in the pulses 110' (only one indicated) could be delayed by the cables 115 as described above. Or, as shown in FIG. 5B, multiple pulsed power sources 105' of the apparatus 505 can be triggered by separate trigger signals 112'. In such an instance, the trigger signals 112' can be staggered. Or, alternatively, the separate trigger signals 112' in FIG. 5B can be transmitted at the same time with the delays among the pulses 110' again being introduced by the cables 115'.

Note the distinction between "attenuate" and "delay". "Attenuate" means reducing the amplitude whereas "delay" means inducing a delay in the relative "start time" of the pulse. If we are talking about a repetitive signal (a long-time sine wave, for instance), then a delay in the start time equates to a delay in position of the harmonic signal, which is also a phase delay.

We can use different methods of imparting phase delay: the phase shifter mentioned in the apparatus, the separate trigger circuits mentioned above, or a delay line in the voltage pulse between the pulsed power and the source module.

The intent of this invention is to provide for the design and generation of a high-frequency wideband signals using easier to produce narrower band signals. The composite signal, $f_c(t)$, is a linear combination of a finite number of component signals, $f_i(t)$:

$$f_c(t) = f_0(t) + f_1(t) + f_2(t) + \ldots + f_n(t) = \sum_{i=0}^{n} f_i(t). \quad (1)$$

Correspondingly, the Fourier Transform can be written as:

$$F_c(\omega) = \sum_{i=0}^{n} F_i(\omega), \quad (2)$$

With, $F_i(\omega)$, the Fourier Transform of the component signal defined as:

$$F_i(\omega) = \int_0^\infty f_i(t) e^{-j\omega t} dt. \quad (3)$$

The integration in Eq. (3) does not extend from $-\infty$ to $+\infty$ because signals are limited to positive time.

Figure 6:
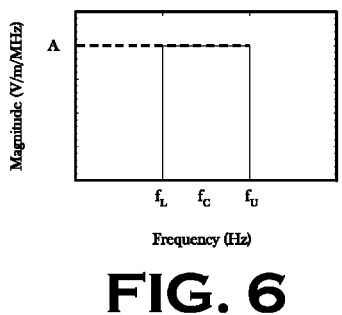
FIG. 6 illustrates some characteristics of an "ideal" wideband pulse.

Now consider a wideband signal, characterized by a magnitude, A, center frequency, $f_c$, and bandwidth, BW. These parameters are associated with the magnitude of the Fourier Transform of the wideband signal. The magnitude of the Fourier Transform of an "ideal" wideband signal would be a square pulse with amplitude of A V/m/Hz, centered at $f_c$ Hz with a width of BW Hz as shown in FIG. 6. In the figure, BW=$f_U - f_L$. A pulse with these characteristics has all of its energy constrained within the bandwidth of interest—in other words, no energy is wasted outside of the band of interest. A realistic pulse that closely emulates this "ideal" pulse will be spectrally efficient. The objective is to make the magnitude of Eq. (2) to look as much as possible like FIG. 6. This will be illustrated with a specific example.

Consider the damped sinusoidal waveform defined by the equation:

$$g(t) = A(e^{-\beta t} - e^{-(\alpha+\beta)t})\sin(2\pi f t)U(t), \quad (4)$$

Figure 7:
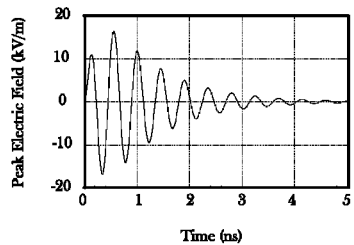
FIG. 7 graphs an illustrative damped sinusoidal waveform.

A is the amplitude, $\alpha$ and $\beta$ are time constants associated with the rise and fall times of the double exponential (the envelope of the damped sine), f is the frequency of the sine wave, t is the variable for time, and the function U(t) restricts the equation to positive time. An example of this waveform is shown in FIG. 7. This can be further generalized to allow for the introduction of a time delay in the signal as:

$$g(t-\tau) = A(e^{-\beta(t-\tau)} - e^{-(\alpha+\beta)(t-\tau)})\sin(2\pi f(t-\tau))U(t-\tau), \quad (5)$$

For application in Eq. (1), Eq. (5) will be rewritten as:

$$g_i(t) = A_i(e^{-\beta_i(t-\tau_i)} - e^{-(\alpha_i+\beta_i)(t-\tau_i)})\sin(2\pi f_i(t-\tau_i))U(t-\tau_i), \quad (6)$$

and finally from Eq. (1) the composite function is written as:

$$g_c(t) = \sum_{i=0}^{n} g_i(t) \quad (7)$$

Now, the Fourier Transform, from Eq. (3), associated with Eq. (4) is found to be:

$$G(\omega) = A\frac{2\pi f}{(\beta+j\omega)^2 + (2\pi f)^2} - A\frac{2\pi f}{(\alpha+\beta+j\omega)^2 + (2\pi f)^2}, \quad (8)$$

where $j = \sqrt{-1}$, $\omega$ is the angular frequency variable, and all other variables are as previously defined. The time shift theory, found in any text book including discussion on Fourier Transforms, will be used to account for the time delay the signal may experience. The Fourier Transform of Eq. (5) is then:

$$G(\omega) = A\frac{2\pi f}{(\beta+j\omega)^2 + (2\pi f)^2}e^{-j\omega\tau} - A\frac{2\pi f}{(\alpha+\beta+j\omega)^2 + (2\pi f)^2}e^{-j\omega\tau}. \quad (9)$$

Figure 8:
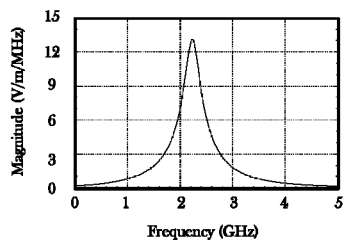
FIG. 8 graphs the magnitude of the Fourier transform of the damped sine wave of FIG. 7.

The magnitude of the Fourier Transform for the waveform shown in FIG. 7 is shown in FIG. 8. For compatibility with Eq. (2), Eq. (9) can be rewritten as:

$$G_i(\omega) = \quad (10)$$
$$A_i\frac{2\pi f_i}{(\beta_i+j\omega)^2 + (2\pi f_i)^2}e^{-j\omega\tau_i} - A_i\frac{2\pi f_i}{(\alpha_i+\beta_i+j\omega)^2 + (2\pi f_i)^2}e^{-j\omega\tau_i},$$

And the Fourier Transform of the composite waveform is then:

$$G_c(\omega) = \sum_{i=0}^{n} G_i(\omega). \quad (11)$$

Now all that remains to be done is to make Eq. (11) which is comprised of waveforms similar to FIG. 8 look like FIG. 6. The results of a trial and error effort will now be shown, keeping in mind that the preferred method would be to have a computer optimize the parameters of the component signals.

Figure 9:
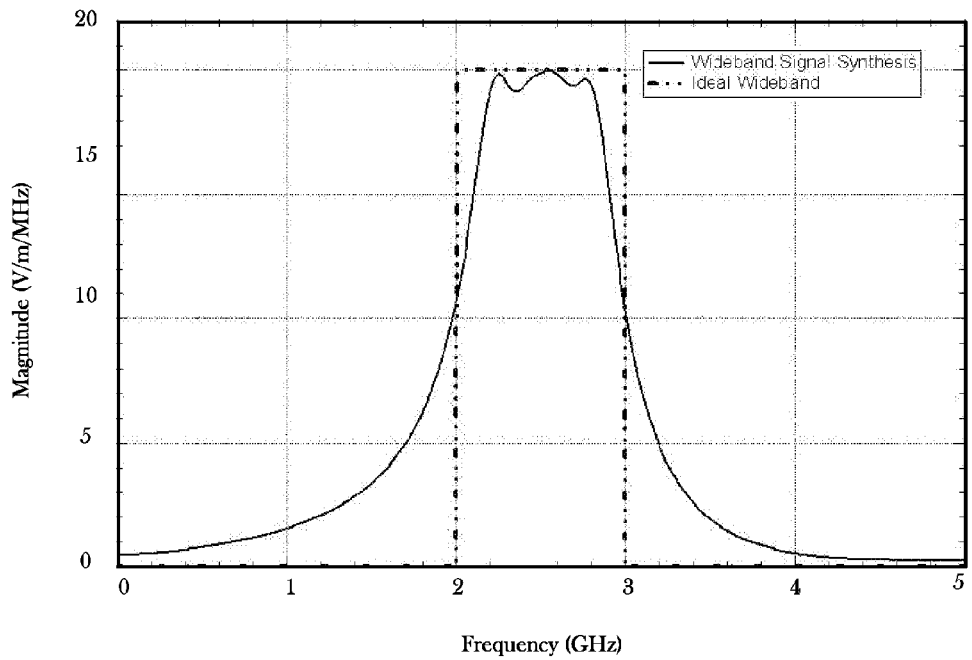
FIG. 9 graphs the Fourier transform magnitude realized with the wideband signal synthesis technique of the present invention.
Figure 10:
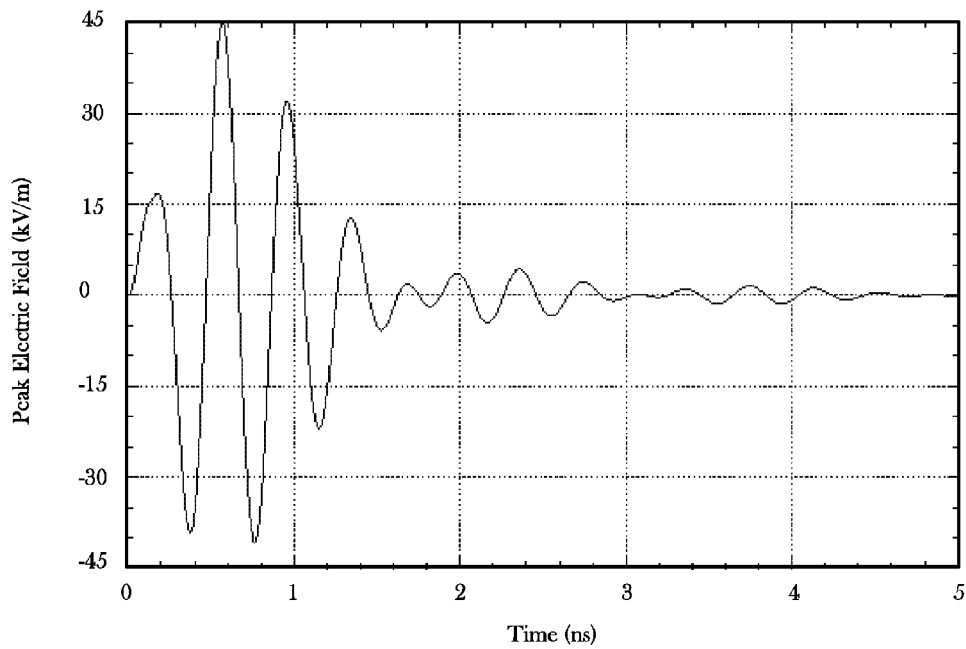
FIG. 10 graphs the wideband signal corresponding to the Fourier transform of FIG. 9.

FIG. 9 shows the linear combination of 4 damped sinusoids with the amplitudes, $A_i$, sinusoidal frequency, $f_i$, and the time delay, $t_i$, adjusted to maximize the area under the magnitude of the Fourier Transform curve. The comparison to the ideal waveform is also shown in FIG. 9. (A, $\alpha$, $\beta$, f, and t are n-element vectors containing the parameters of the component signals.) For example, $A_i$ is the amplitude of $g_i(t)$ in Eq. (6) and Eq. (7), $t_k$ is the time delay associated with $g_k(t)$ in Eq. (6) and Eq. (7), and so forth. FIG. 10 shows the wideband waveform associated with the Fourier Transform magnitude of FIG. 9. It can be seen that the wave of FIG. 10 has shorter pulse length, hence wider bandwidth, than that shown in FIG. 7.

The component signals that are combined do not necessarily have to be damped sinusoidal with double exponential envelopes and alternative embodiments may employ alternative waveforms. The wideband signal synthesis can be determined using a computer running some kind of optimization technique to find the best A's, $\alpha$'s, $\beta$'s, f's, and t's. The figure of merit—i.e., the characteristic of the synthetic wideband signal sought to be optimized—used herein to indicate the degree of optimization may not be the best one in all embodiments.

The optimization technique used in the illustrated embodiment was written in MATHCAD. The technique was a linear program wherein the time delay of the component sources was iterated over a set of values for each component source. For example, the delay for component sources 2 through 4 was iterated from 0 to 1 nanosecond in 100 picosecond steps. The delay of component source 1 was kept at 0. The values of the time delay values that maximized the integral of the Fourier transform (i.e., the figure of merit, discussed further below) was then kept. However, this is but one optimization technique and other optimization techniques may be employed in alternative embodiments.

With respect to the figure of merit, the illustrated embodiment employs the area under the magnitude curve of FIG. 9. This would maximize the energy content of the synthetic wideband signal. However, alternative embodiments may use alternative figures of merit. Another figure of merit that might be used would be "spectral efficiency"—the degree to which the synthetic wideband signal's spectrum approximates a square wave over the frequency band. Other figures of merit could include bandwidth, time duration of the output pulse, and power required in the source modules (either individually or summed amongst them all). Optimization of these figures would be user defined and implementation specific. For example, a user might want the pulse with the longest time duration that meets other particular criteria (such as bandwidth and amplitude). Or, they might want the shortest duration pulse.

To produce the signal shown in FIG. 10 required 4 individual damped sine waves with:

$$A = [3.2 \times 10^4, 3.2 \times 10^4, 1.35 \times 10^4, 1.35 \times 10^4]^T$$

$$\alpha = [3.9 \times 10^9, 3.9 \times 10^9, 3.9 \times 10^9, 3.9 \times 10^9]^T$$

$$\beta = [9.8 \times 10^8, 9.8 \times 10^8, 9.8 \times 10^8, 9.8 \times 10^8]^T$$

$$f = [2230, 2810, 2423, 2617]^T \times 10^6$$

$$\tau = [0.0, 1.33, 0.1, 1.2]^T \times 10^{-10}. \quad (12)$$

It can be seen that, in this particular embodiment, A, f, and τ were adjusted while α and β were held constant. However, this is not necessary to the practice of the invention.

Furthermore, in the illustrated embodiment, the process is used to determine the delays for the constituent narrowband signals that are used in synthesizing the wideband signal. The process may also be employed to ascertain other characteristics of the constituent narrowband signals. For example, the process may be used to determine the amplitudes, frequency, risetime, and falltime (α's and β's) of the constituent narrowband signals.

Figure 11:
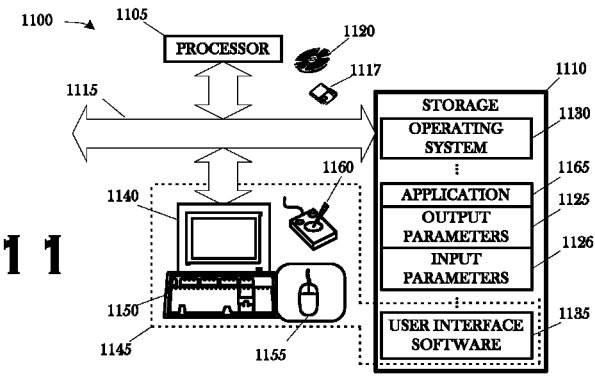
FIG. 11 illustrates selected portions of the hardware and software architectures of an exemplary computing apparatus on which certain aspects of the present invention may be practiced.

FIG. 11 shows selected portions of the hardware and software architecture of a computing apparatus such as may be employed in some aspects of the present invention. More particularly, the determination of the delays in the constituent signals prior to combination determined as described above will be performed on some kind of computing apparatus. Thus, in one aspect, the present invention is a software implemented method for determining the delays in constituent narrowband radio frequency signals for use in wideband signal synthesis. The computing apparatus 1100 includes a processor 1105 communicating with storage 1110 over a bus system 1115. The storage 1110 may include a hard disk and/or random access memory ("RAM") and/or removable storage such as a floppy magnetic disk 1117 and an optical disk 1120.

The storage 1110 is encoded with output parameters 1125 and input parameters 1126. The output parameters 1125 include the characteristics of the constituent narrow band signals 125-128, shown in FIG. 1, as determined by the method described above. The input parameters 1126 include the desired parameters of the wideband signal to be synthesized. This would include an identification of the figure of merit, as well. Note that the output parameters 1125 are determined by the automated (i.e., without human interaction) performance of the software-implemented method described above. As such, they will not be found on the storage 1110 until after the method is performed. The software-implemented therefore effects a physical change on the storage 1110 by altering the content with which it is encoded.

The storage 1110 is also encoded with an operating system 1130, user interface software 1135, and an application 1165. The user interface software 1135, in conjunction with a display 1140, implements a user interface 1145. The user interface 1145 may include peripheral I/O devices such as a keypad or keyboard 1150, a mouse 1155, or a joystick 1160. The processor 1105 runs under the control of the operating system 1130, which may be practically any operating system known to the art. The application 1165 may be invoked by the operating system 1130 upon power up, reset, or both, depending on the implementation of the operating system 1130. Or, the user may invoke the application in conventional fashion through the user interface 1145. The application 1165, when invoked, performs the method of the present invention described above.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for synthesizing a wideband signal, comprising:
    generating a plurality of narrowband radio frequency signals from a plurality of sources by:
    sequentially triggering a plurality of pulsed power sources, each from a respective trigger, to generate a plurality of respective pulses,
    wherein each respective pulse of the plurality of respective pulses pulses a respective source of the plurality of sources to generate a respective narrowband radio frequency signal of the plurality of narrowband radio frequency signals, the narrowband radio frequency signals being time delayed with respect to one another; and
    constructively superimposing the narrowband radio frequency signals.

2. The method of claim 1, wherein constructively superimposing the narrowband radio frequency signals includes combining the narrowband radio frequency signals.

3. The method of claim 1, wherein constructively superimposing the narrowband radio frequency signals includes sequentially radiating the narrowband radio frequency signals.

4. An apparatus for synthesizing a wideband signal, comprising:

means for generating a plurality of narrowband radio frequency signals that are time delayed with respect to one another, the means for generating comprising:
a plurality of narrowband radio frequency sources, each narrowband radio frequency source of the plurality of narrowband radio frequency sources operable to generate a respective narrowband radio frequency signal of the plurality of narrowband radio frequency signals when pulsed;
means for pulsing the plurality of narrowband radio frequency sources; and
means for phase delaying the respective narrowband radio frequency signals of the plurality of narrowband radio frequency signals; and
means for constructively superimposing the plurality of narrowband radio frequency signals.

5. The apparatus of claim 4, wherein the generating means includes means for pulsing the plurality of narrowband radio frequency sources with a respective pulse.

6. The apparatus of claim 4, wherein the constructively superimposing means includes means for combining the plurality of narrowband radio frequency signals.

7. The apparatus of claim 4, wherein the constructively superimposing means includes sequentially radiating the plurality of narrowband radio frequency signals.

8. A method for synthesizing a wideband signal, comprising:
generating a plurality of narrowband radio frequency signals from a plurality of sources by pulsing each respective source of the plurality of sources with a respective pulse of a plurality of pulses, by:
triggering a plurality of pulsed power sources from a common trigger to generate each respective pulse of the plurality of pulses; and
phase delaying each respective pulse of the plurality of pulses to each respective source of the plurality of sources;
wherein the plurality of narrowband radio frequency signals are time delayed with respect to one another; and
constructively superimposing the plurality of narrowband radio frequency signals.

9. A method for synthesizing a wideband signal, comprising:
generating a plurality of narrowband radio frequency signals from a plurality of sources by:
triggering a plurality of pulsed power sources from a common trigger to generate a plurality of respective pulses, wherein each respective pulse of the plurality of respective pulses is phase delayed prior to pulsing a respective source of the plurality of sources to generate a respective narrowband radio frequency signal of the plurality of narrowband radio frequency signals, the plurality of narrowband radio frequency signals being time delayed with respect to one another; and
constructively superimposing the plurality of narrowband radio frequency signals.

10. A method for synthesizing a wideband signal, comprising:
generating a plurality of narrowband radio frequency signals from a plurality of sources by:
simultaneously triggering a plurality of pulsed power sources, each from a respective trigger, to generate a plurality of respective pulses, wherein each respective pulse of the plurality of respective pulses is phase delayed prior to pulsing a respective source of the plurality of sources to generate a respective narrowband radio frequency signal of the plurality of narrowband radio frequency signals, the plurality of narrowband radio frequency signals being time delayed with respect to one another; and
constructively superimposing the plurality of narrowband radio frequency signals.

11. An apparatus for synthesizing a wideband signal, comprising:
means for generating a plurality of narrowband radio frequency signals that are time delayed with respect to one another, the means for generating comprising:
a plurality of narrowband radio frequency sources;
means for pulsing the plurality of narrowband radio frequency sources with a common pulse; and
means for phase delaying the common pulse to each respective narrowband radio frequency source of the plurality of narrowband radio frequency sources; and
means for constructively superimposing the plurality of narrowband radio frequency signals.

12. A method for synthesizing a wideband signal, comprising:
generating a plurality of narrowband radio frequency signals from a plurality of sources by pulsing each of the plurality of sources with a pulse, by sequentially triggering each of the sources to generate the respective narrowband radio frequency signals, wherein the plurality of narrowband radio frequency signals are time delayed with respect to one another; and
constructively superimposing the plurality of narrowband radio frequency signals.

* * * * *